United States Patent
Staats (10) Patent No.: US 7,421,507 B2
(45) Date of Patent: Sep. 2, 2008

(54) TRANSMISSION OF AV/C TRANSACTIONS OVER MULTIPLE TRANSPORTS METHOD AND APPARATUS

(75) Inventor: Erik P. Staats, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/540,303

(22) Filed: Sep. 28, 2006

(65) Prior Publication Data

US 2007/0027998 A1 Feb. 1, 2007

Related U.S. Application Data

(63) Continuation of application No. 09/505,385, filed on Feb. 16, 2000, now abandoned.

(51) Int. Cl.
*G06F 15/16* (2006.01)

(52) U.S. Cl. .................. 709/230; 709/203; 709/213; 709/238; 709/240; 709/244; 709/246; 710/29; 710/105; 710/306; 710/316

(58) Field of Classification Search ................. 709/202, 709/228, 232, 203, 213, 231, 238, 246, 230, 709/236, 240, 244; 710/29, 105, 306, 316
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 4,750,109 A | 6/1988 | Kita | |
| 5,014,262 A | 5/1991 | Harshavardhana | |
| 5,274,631 A | 12/1993 | Bhardwaj | |
| 5,341,377 A * | 8/1994 | Ohtani | 370/524 |
| 5,343,461 A | 8/1994 | Barton et al. | |
| 5,376,969 A | 12/1994 | Zdepski | |
| 5,394,556 A | 2/1995 | Oprescu | |
| 5,452,330 A | 9/1995 | Goldstein | |
| 5,490,253 A | 2/1996 | Laha et al. | |
| 5,493,568 A | 2/1996 | Sampat et al. | |
| 5,495,481 A | 2/1996 | Duckwall | |
| 5,535,338 A * | 7/1996 | Krause et al. | 709/222 |
| 5,537,417 A * | 7/1996 | Sharma et al. | 709/228 |
| 5,539,390 A | 7/1996 | Nagano et al. | |
| 5,541,670 A | 7/1996 | Hanai | |
| 5,568,487 A | 10/1996 | Sitbon et al. | |
| 5,568,641 A | 10/1996 | Nelson | |

(Continued)

OTHER PUBLICATIONS

"Information Technology-Microprocessor Systems-Control and Status Registers (CSR) Architecture for Microcomputer Buses" ANSI/IEEE Standard 1212 The Institute of Electrical and Electronics Engineers Inc. pp. 1-222 1994 Edition.

(Continued)

*Primary Examiner*—Michael Won
(74) *Attorney, Agent, or Firm*—Gazdzinski & Associates (57) ABSTRACT

Disclosed is a system and method for transmitting AV/C data over one or more transports. Further disclosed is a system and method for transmitting AV/C data over non-FCP communication media. The disclosed system and method includes an AV/C transaction delivery system which operates in conjunction with communicatively coupled AV/C protocol layers, AV/C transport layers, and AV/C transport controllers to effectuate transmission of AV/C transaction data without regard to protocol.

25 Claims, 6 Drawing Sheets

U.S. PATENT DOCUMENTS

| | | | |
|---|---|---|---|
| 5,583,922 A | 12/1996 | Davis et al. | |
| 5,621,659 A | 4/1997 | Matsumoto et al. | |
| 5,630,173 A | 5/1997 | Oprescu | |
| 5,640,595 A | 6/1997 | Baugher et al. | |
| 5,684,715 A | 11/1997 | Palmer | |
| 5,701,476 A | 12/1997 | Fenger | |
| 5,701,492 A | 12/1997 | Wadsworth et al. | |
| 5,712,834 A | 1/1998 | Nagano et al. | |
| 5,719,862 A | 2/1998 | Lee et al. | |
| 5,784,648 A | 7/1998 | Duckwall | |
| 5,787,259 A | 7/1998 | Haroun et al. | |
| 5,793,982 A * | 8/1998 | Shrader et al. | 709/232 |
| 5,802,048 A | 9/1998 | Duckwall | |
| 5,802,057 A | 9/1998 | Duckwall et al. | |
| 5,802,306 A * | 9/1998 | Hunt | 709/228 |
| 5,805,073 A | 9/1998 | Nagano et al. | |
| 5,809,331 A | 9/1998 | Staats et al. | |
| 5,832,298 A | 11/1998 | Sanchez et al. | |
| 5,835,761 A | 11/1998 | Ishii et al. | |
| 5,867,730 A | 2/1999 | Leyda | |
| 5,875,301 A | 2/1999 | Duckwall et al. | |
| 5,894,557 A * | 4/1999 | Bade et al. | 709/228 |
| 5,938,764 A | 8/1999 | Klein | |
| 5,968,152 A | 10/1999 | Staats | |
| 5,970,052 A | 10/1999 | Lo et al. | |
| 5,987,605 A | 11/1999 | Hill et al. | |
| 5,991,842 A * | 11/1999 | Takayama | 710/105 |
| 6,032,202 A | 2/2000 | Lea et al. | |
| 6,038,625 A | 3/2000 | Ogino et al. | |
| 6,070,187 A | 5/2000 | Subramaniam et al. | |
| 6,073,206 A | 6/2000 | Piwonka et al. | |
| 6,091,726 A | 7/2000 | Crivellari et al. | |
| 6,122,248 A | 9/2000 | Murakoshi et al. | |
| 6,131,129 A | 10/2000 | Ludtke et al. | |
| 6,133,938 A | 10/2000 | James | |
| 6,138,196 A | 10/2000 | Takayama et al. | |
| 6,141,702 A | 10/2000 | Ludtke et al. | |
| 6,141,767 A | 10/2000 | Hu | |
| 6,157,972 A | 12/2000 | Newman et al. | |
| 6,160,796 A | 12/2000 | Zou | |
| 6,167,532 A | 12/2000 | Wisecup | |
| 6,173,327 B1 | 1/2001 | De Borst et al. | |
| 6,192,189 B1 | 2/2001 | Fujinami et al. | |
| 6,202,210 B1 | 3/2001 | Ludtke et al. | |
| 6,219,697 B1 | 4/2001 | Lawande et al. | |
| 6,226,680 B1 | 5/2001 | Boucher et al. | |
| 6,233,615 B1 | 5/2001 | Van Loo | |
| 6,233,624 B1 | 5/2001 | Hyder et al. | |
| 6,247,083 B1 | 6/2001 | Hake et al. | |
| 6,253,114 B1 | 6/2001 | Takihara | |
| 6,253,255 B1 | 6/2001 | Hyder et al. | |
| 6,260,063 B1 | 7/2001 | Ludtke et al. | |
| 6,266,334 B1 | 7/2001 | Duckwall | |
| 6,266,701 B1 | 7/2001 | Sridhar et al. | |
| 6,275,889 B1 | 8/2001 | Saito | |
| 6,282,597 B1 | 8/2001 | Kawamura | |
| 6,295,479 B1 | 9/2001 | Shima et al. | |
| 6,308,222 B1 | 10/2001 | Krueger et al. | |
| 6,311,228 B1 | 10/2001 | Ray | |
| 6,334,161 B1 * | 12/2001 | Suzuki et al. | 710/29 |
| 6,345,315 B1 | 2/2002 | Mishra | |
| 6,353,868 B1 | 3/2002 | Takayama et al. | |
| 6,385,679 B1 | 5/2002 | Duckwall et al. | |
| 6,405,247 B1 | 6/2002 | Lawande et al. | |
| 6,442,630 B1 | 8/2002 | Takayama et al. | |
| 6,519,671 B1 | 2/2003 | Kondou et al. | |
| 6,603,737 B1 | 8/2003 | Fukunaga et al. | |
| 6,718,424 B1 | 4/2004 | Cruz | |

OTHER PUBLICATIONS

"IEEE Standard for a High Performance Serial Bus" IEEE Standard 1394-1995 Institute of Electrical and Electronics Engineers Inc. Aug. 30, 1996.

"IEEE Standard for the High Performance Serial Bus-Amendment 1" Institute of Electrical and Electronics Engineers Inc. pp. 1-196 2000 (no month).

P1394b IEEE Draft Standard for High Performance Serial Bus (High SPeed Supplement) Institute of Electrical and Electronics Engineers Inc. 1-408 2002 (no month).

"AV/C Digital Interface Command Set General Specification Rev.3.0" 1394Trade Association pp. 4-5 20-34 Apr. 15, 1998.

"Enhancements to the AV/C General Specification 3.0 Version 1.OFCI" 1394 Trade Association pp. 4 6-17 Nov. 5, 1998.

"Fibre Channel-Methodologies for Jitter Specification" NCITS TR-25-1999, Jitter Working Group Technical Report Rev. 10, pp. 1-96 June 9, 1999.

* cited by examiner

TRANSMISSION OF AV/C TRANSACTIONS OVER MULTIPLE TRANSPORTS METHOD AND APPARATUS

This application is a continuation of and claims priority to U.S. patent application Ser. No. 09/505,385 filed Feb. 16, 2000 now abandoned of the same title, which is incorporated herein by reference in its entirety.

BACKGROUND OF THE INVENTION

1. Field of the Invention

This invention relates to implementing Audio/Video Control (AV/C) device communication systems, as in the AV/C Digital Interface Command Set specified by IEEE 1394. More particularly, this invention relates to techniques for implementing the AV/C data packets over multiple transports. Application of this invention may especially be found in the realm of IEEE 1394 systems and applications.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbits/second. Most consumer electronic devices available on the market have supported either 100 or 100/200 Mbits/second; meaning that plenty of headroom remains in the 1394 specification. However, as more devices are added to a system, and improvements in the quality of the A/V data (i.e., more pixels and more bits per pixel) emerge, a need for greater bandwidth has been indicated.

The 1394a specification (pending approval) offers efficiency improvements, including support for very low power, arbitration acceleration, fast reset and suspend/resume features. However, not all devices meet the 1394 specification and not all devices communicate by way of the same protocols.

The AV/C control protocol was designed to operate over the Function Control Protocol (FCP) transport via an IEEE-1394 bus. There is no implementation for the AV/C control protocol over any transport other than FCP. The old method of implementing the AV/C protocol assumes a single transport, FCP, and uses direct calls to the FCP transport implementation. Thus, current implementations hardwire the AV/C control protocol layer to the FCP transport layer. If another AV/C transport layer were defined, these implementations would have to be redesigned.

The current AV/C transport layer, FCP, is a rather low performance transport protocol. While initially AV/C was designed as a low speed protocol for controlling AV devices such as camcorders, it is now being used as a file system protocol for AV storage devices such as AV disk drives. This new use will require a higher performance transport protocol for applications such as home AV servers. Such transports may be asynchronous connections or Serial Bus Protocol (SBP) connections.

In addition, certain standards bodies, such as the Video Electronics Standards Association (VESA), are specifying the transport of AV/C via IP over non-1394 networks such as ethernet. Current implementations of the AV/C protocol will not only need to support transports other than FCP but will need to simultaneously support multiple transports for AV/C control of devices with different transport capabilities. Thus, a method is required for separating the AV/C protocol implementation from the AV/C transport implementation and that also supports multiple transports running simultaneously.

It is therefore desirable to overcome this shortcoming by providing a means for devices to communicate with one another without regard to protocols or connectivity. This is especially true today, when users of such devices have an ever-growing desire to couple all types of audio/video equipment to their personal computers for instance. However, at present there is no convenient means for enabling multiple such devices to communicate one with the others. That is, a user may be able to connect a video camera to a computer if they have the appropriate cables and protocols. However, if that user wishes to connect an A/V system to a computer network and a video camera, matters are far more difficult, if not impossible in many instances.

BRIEF DESCRIPTION OF THE INVENTION

To overcome these and other shortcomings of the prior art, this invention separates the implementation of the AV/C protocol from the implementation of the AV/C transport. In addition, it allows the transport of AV/C commands over more than one transport simultaneously. Thus, this invention allows the AV/C protocol implementation to communicate over higer performance transports such as asynchronous connections or SBP and non 1394 transports such as IP over ethernet or various wireless transports. This invention also allows the AV/C protocol to operate over multiple FCP transports that may exist over multiple 1394 networks connected to the same node.

This invention separates the implementation of the AV/C protocol layer and the AV/C transport layer. This invention defines an AV/C transport controller as a software plug-in that provides AV/C transport services to the AV/C protocol layer. The AV/C transport services provided by the AV/C transport controller abstract the implementation of the particular AV/C transport. The services are the same regardless of the type of transport (FCP, asynchronous connections, SBP, ethernet, etc.).

Each AV/C transport controller may control multiple transport instances (or transports). For example, a node containing two 1394 link interfaces and an AV/C FCP transport controller would have two instances of AV/C FCP transports.

For each available AV/C transport, the AV/C protocol layer maintains an AV/C transport reference. For each device with which it communicates, the AV/C protocol layer associates an AV/C transport reference indicating both the AV/C transport controller and the specific AV/C transport instance used to transport AV/C commands to the device.

Each AV/C transport controller is responsible for enumerating the available AV/C transport instances. For each available transport instance, the AV/C transport controller creates an AV/C transport reference and presents it to the AV/C protocol layer.

The set of AV/C transport services provided by an AV/C transport controller include handling of requests to transmit an AV/C command or response, indication of receipt of AV/C commands or responses, and indication of new devices able to communicate over the AV/C transport.

It is therefore an object of the present invention to provide a system for communicating AV/C data packets between devices without regard to protocols.

It is another object of the present invention to provide a method for transmitting AV/C transactions over multiple transports without regard for protocols.

It is yet another object of the present invention to provide a system for transmitting AV/C data across an IP or other non-FCP network.

Viewed from a first vantage point, an AV/C transaction data delivery system is disclosed, comprising in combination at least one transport controller; an AV/C transport layer in operative communication with the at least one transport controller; and an AV/C protocol layer in operative communication with the AV/C transport layer, the AV/C protocol layer including means for sending AV/C transaction data over more than one transport.

Viewed from a second vantage point, a method for establishing transport routing information in an AV/C transaction data delivery system is disclosed, comprising in combination detecting a transport; creating a transport ID associated with the transport; notifying a transport layer of the transport ID; indexing the transport ID; associating the indexed transport ID with a device.

Viewed from a third vantage point, a method for sending AV/C transaction data in an AV/C transaction data delivery system is disclosed, comprising in combination receiving AV/C transaction data for transport; associating the AV/C transaction data with a transport ID; providing the AV/C transaction data and transport ID to a transport layer; associating the transport ID with a transport controller bus ID; and providing the AV/C transaction data to a transport controller data record associated with the bus ID.

Viewed from a fourth vantage point, a method for receiving AV/C transaction data in an AV/C transaction data delivery system is disclosed, comprising in combination receiving AV/C transaction data by a transport controller and associating the data with a link ID; converting the link ID to a data record and a bus ID; providing the bus ID and the data to a transport layer; associating the bus ID with a transport ID; and providing the transport layer ID and data to a protocol layer.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
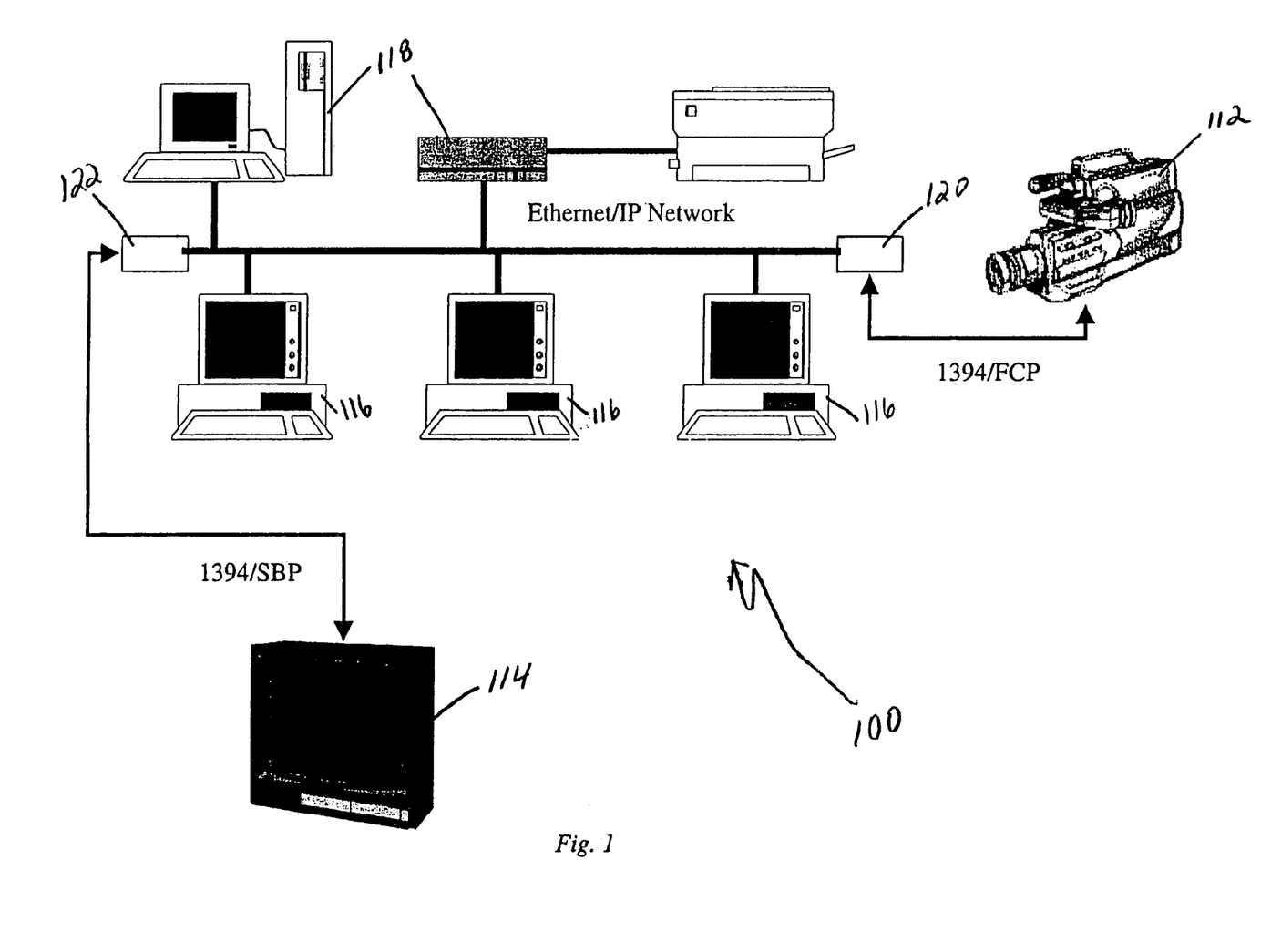
FIG. 1 is a schematic diagram of an exemplary physical illustration of the present invention.

Referring now to the drawing figures wherein like reference numerals denote like parts throughout the drawing figures, FIG. 1 is directed to an overview 100 of the present invention. Depicted is a network 100, including a centralized computer network utilizing the Internet Protocol (IP) over ethernet, and a first AV/C device in the form of a video camera 112, and a second AV/C device in the form of a television 114. The AV/C devices 112 and 114 are likewise connected to the network as will be described in greater detail below.

Devices on the centralized computer network include devices readily recognized by persons of ordinary skill in the art, such as computers 116, and servers 118. Also included on the network 100, however, are video camera 112 and television 114. Although these devices do not normally operate via IP, they are connected to the network, nonetheless, via bridges 120 and 122. That is, one side of bridge 120 is connected to ethernet media, while the other side is connected to 1394 media and thereafter connected to video camera 112. Likewise, one side of bridge 122 is connected to an ethernet link, while the other side is coupled to a 1394 link and thereafter to television 114.

Interestingly, video camera 112 normally communicates via the FCP protocol, while television 114 normally communicates via SBP. However, the bridges 120 and 122 allow AV/C devices 112 and 114 to communicate across the network 100 regardless of what would otherwise be protocol incompatibilities. Although this embodiment depicts bridges 120 and 122, it should be readily appreciated that the functionality to be described hereinafter of the internal workings of these bridges may in fact be contained within AV/C devices 112 and 114 or similarly fashioned to achieve the same result.

Figure 2:
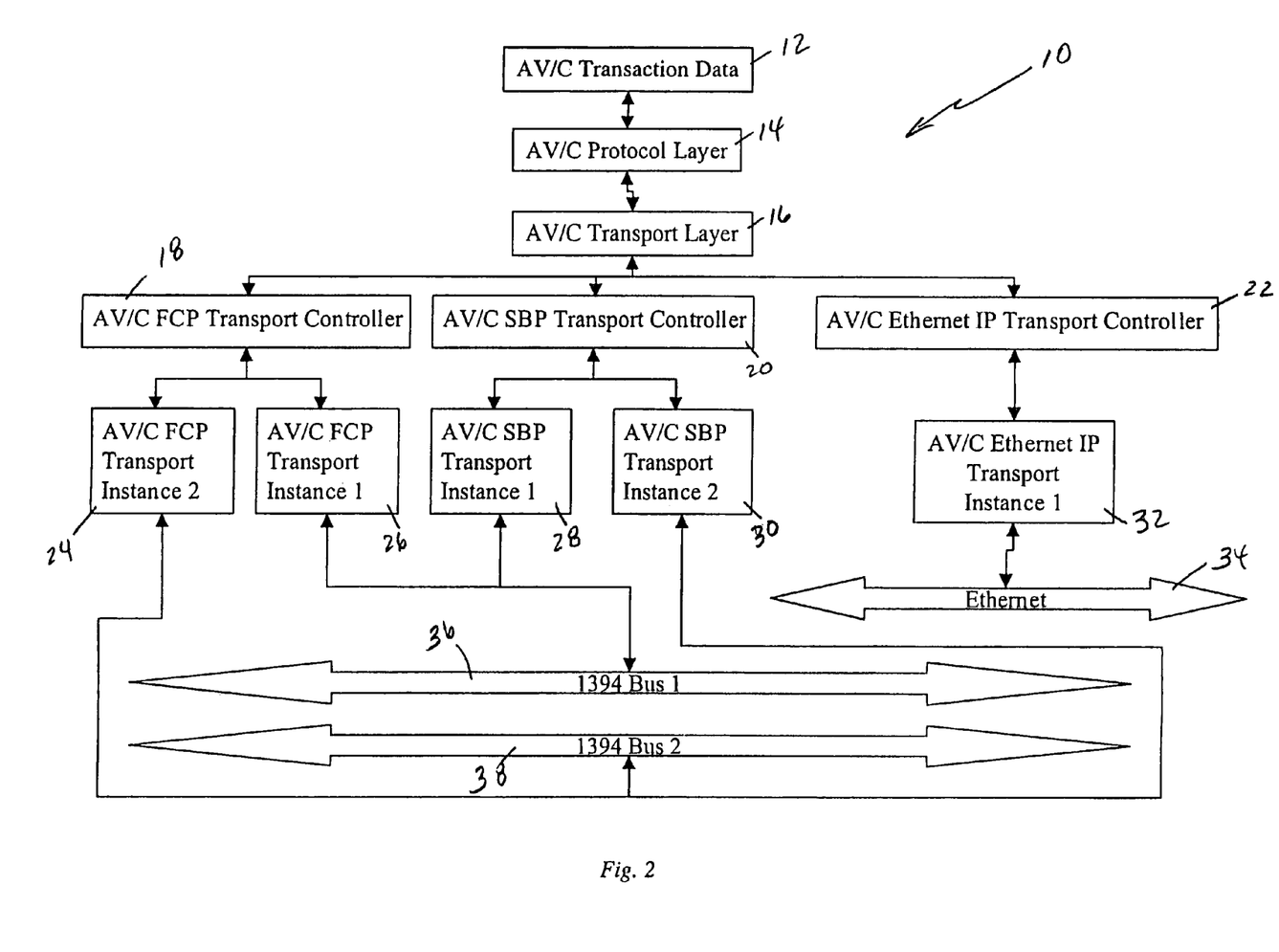
FIG. 2 is a block diagram of one embodiment of the present invention.

To understand how this communication is accomplished, reference is now made to FIG. 2 wherein reference numeral 10 is directed to an exemplary block diagram of the present invention. Initially, an overview of data paths will be discussed for this system 10 and thereafter, further detail will be provided with regard to data handling.

In particular, an AV/C data packet or transaction data 12 to be transmitted via this system will first be presented to AV/C protocol layer 14. AV/C protocol layer 14 will then direct the data packet 12 to one of the several transport instances 24, 26, 28, 30, or 32 as will be understood and coordinated by AV/C transport layer 16. Thereafter, in a manner that will be understood by one of the depicted controllers 18, 20, and 22, the AV/C transport layer will direct the transport indicated by the protocol layer's direction to pass the data packet 12 on to the proper transport instance.

Significantly, during this passing of data between the above mentioned layers 14 and 16 and onward to controllers 18, 20, and 22, the protocol layer will have no information regarding downstream protocols. Rather, protocol layer 14 will only be privy to transport types and destinations. In this manner, the AV/C device sending the data packet 12 need not communicate via a specified protocol, nor will it be limited to a specified path.

For example, an AV/C data packet 12 directed to a device (not shown) on the ethernet media would be directed by AV/C protocol layer 14 to such device by including the ultimate device subunit information (known in AV/C systems) along with the data packet via the ethernet transport controller 22 and the transport instance 32 associated therewith. That is, from the point of view of protocol layer 14 the device that it is trying to send the packet to lies on that transport path. That is all the protocol layer knows. The transport layer 16, upon receipt of the data packet from the protocol layer along with the transport direction, assists the protocol layer by directing the data packet more specifically, as it is privy to additional information regarding the AV/C Ethernet IP Transport Controller 22. In this manner, the data packet may be guided to the appropriate transport instance 32 which understands how to properly communicate via the ethernet path 34.

Likewise, if the data packet 12 were directed instead to a device (not shown) connected to either of the 1394 bus interfaces 36 or 38, any appropriate transport 18 or 20 and any appropriate transport instance 24, 26, 28, or 30 may be utilized. For instance, if the device to be communicated with is connected to the bus 36 and utilizes the SBP protocol, transport controller 20 and transport instance 28 would be indicated for such a data transmission. On the other hand, if the device to be communicated with is connected to bus 38 and prefers FCP, then transport controller 18 and transport instance 24 would be indicated.

Figure 3:
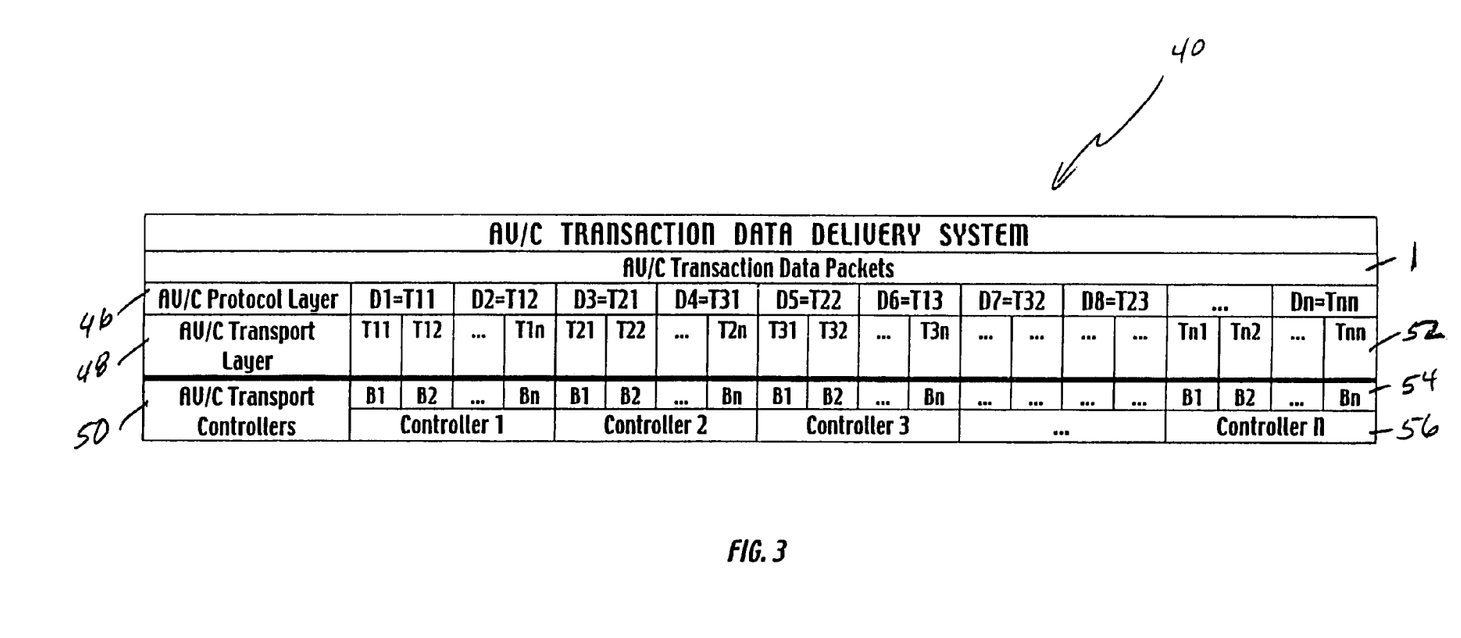
FIG. 3 is a schematic diagram of the AV/C Transaction Data Delivery System of the present invention.

With this overview in mind, reference is now made to FIG. 3 and AV/C transaction data delivery system 40. First will be described the assigning of transport path information to facilitate transport of data. Upon detection of a new transport bus by a particular AV/C transport controller 56 amongst the transport controllers 50, and referring now also to FIG. 4 and method 60, the detecting controller creates a transport bus identification 54. Of course, each controller 56 may identify more than one transport bus connected thereto, and for each, a bus ID 54 is created for that particular controller 56.

Figure 4:
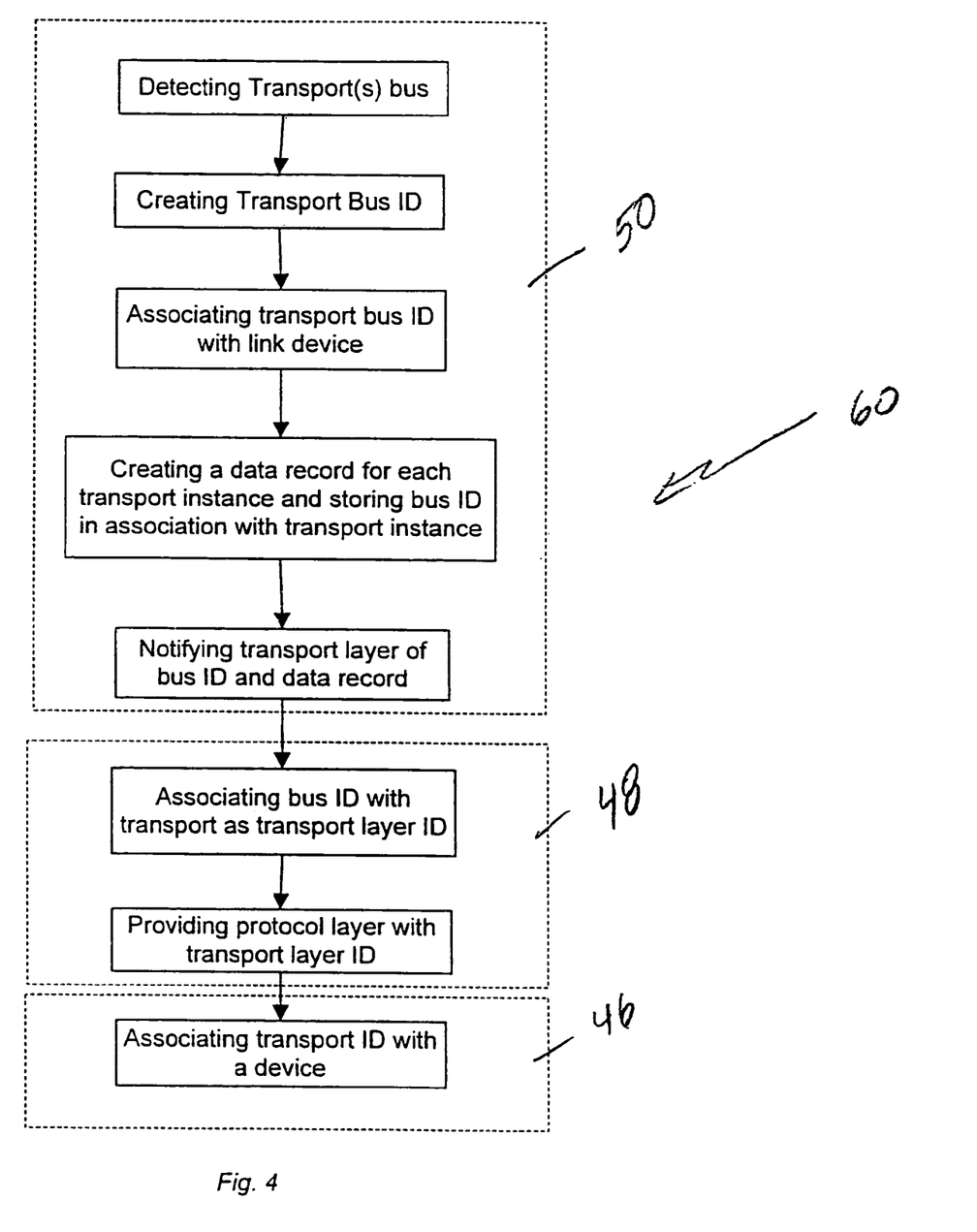
FIG. 4 is a flowchart of the method of establishing transports and identifiers for the transports of the present invention.

The detecting controller 56 likewise associates the assigned bus ID 54, such as B1, with the link device (not shown) to which the bus detected is associated. In this manner, when a message is directed to that bus, the controller will utilize the appropriate link for transport of the message. The bus ID 54 is thus stored in a data record by the controller 56 in a memory space for future retrieval. Furthermore, the controller 56 will notify the AV/C transport layer 48 of the new bus ID 54 and of the data record reference pointer so that the transport layer 48 may direct data for that bus ID 54 appropriately in the future.

The transport layer 48 then assigns a transport instance 52, such as T21, and associates it with the bus ID 54 (B1 for controller 2 in this illustration). Thereafter, the transport layer notifies the AV/C protocol layer 46 of the new transport instance 52. The AV/C protocol layer 46 then associates the new transport instance 52 with a device, such as D3. It should be noted that one of the exalted features of the IEEE 1394 standard is the ability to autodetect devices and hot swap those devices as needed. Therefore, associating such device information with the transport path is deemed sum and substance of an AV/C system utilizing IEEE 1394 interfaces.

In this manner it can be understood that the only information that the protocol layer 46 retains is that of transport type and instance. Therefore, the protocol layer 46 does not require protocol information to send data packets to remote devices. Rather, the protocol layer need only know which transport instance is associated with which device, and data may be sent accordingly. The set of AV/C transport services provided by an AV/C transport controller include handling of requests to transmit an AV/C command or response, indication of receipt of AV/C commands or responses, and indication of new devices able to communicate over the AV/C transport. Thus, the transport controller is responsible for associating devices with transport instances. In its new device indication, it gives a device ID and transport ID.

Figure 5:
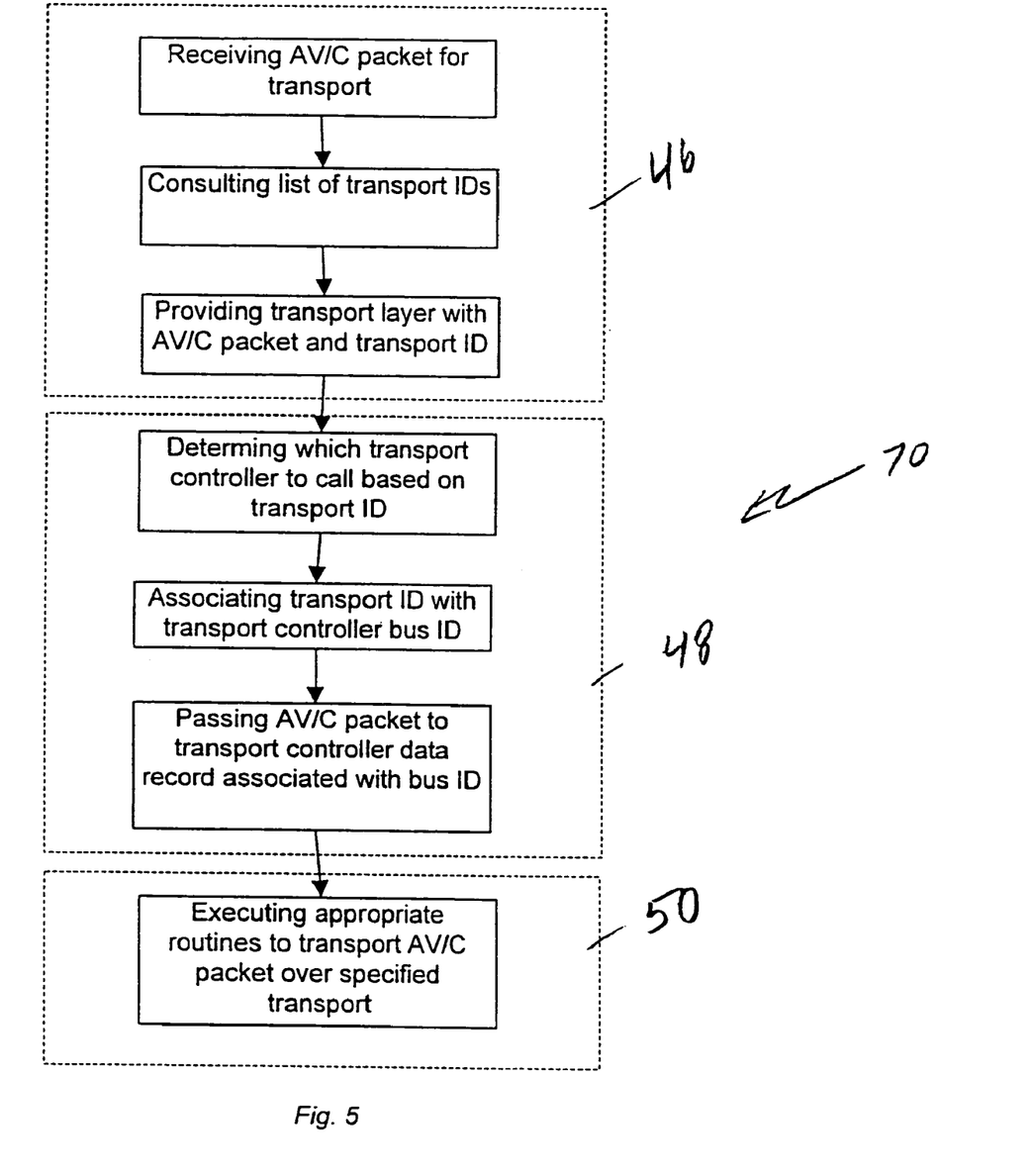
FIG. 5 is a flowchart of the method of sending AV/C data packets of the present invention.

Upon receipt of an AV/C data packet 12 for transmission to a specified device, and referring now also to FIG. 5 and method 70, AV/C protocol layer 46 first consults its list of devices and transport correlation's and selects the appropriate transport instance that will be understood by the transport layer 48. The protocol layer 46 then provides the data packet and transport ID 52 to the transport layer 48 for further transmission. The transport layer 48, likewise, consults its lookup table to ascertain which transport controller and bus ID is associated with the transport ID 52 provided by the protocol layer 46. The transport layer 48 then passes the data packet on to the appropriate transport controller at the data record point associated with the bus ID 54 in question. Thereafter, the transport controller 56 executes appropriate software subroutines to transport the AV/C data packet over the specified transport. For instance, if the data packet in question was being transmitted to a device on an IP path, the data packet may then be wrapped within an appropriate IP packet as will now be appreciated by those skilled in the art having now been provided with the preceding disclosure.

Figure 6:
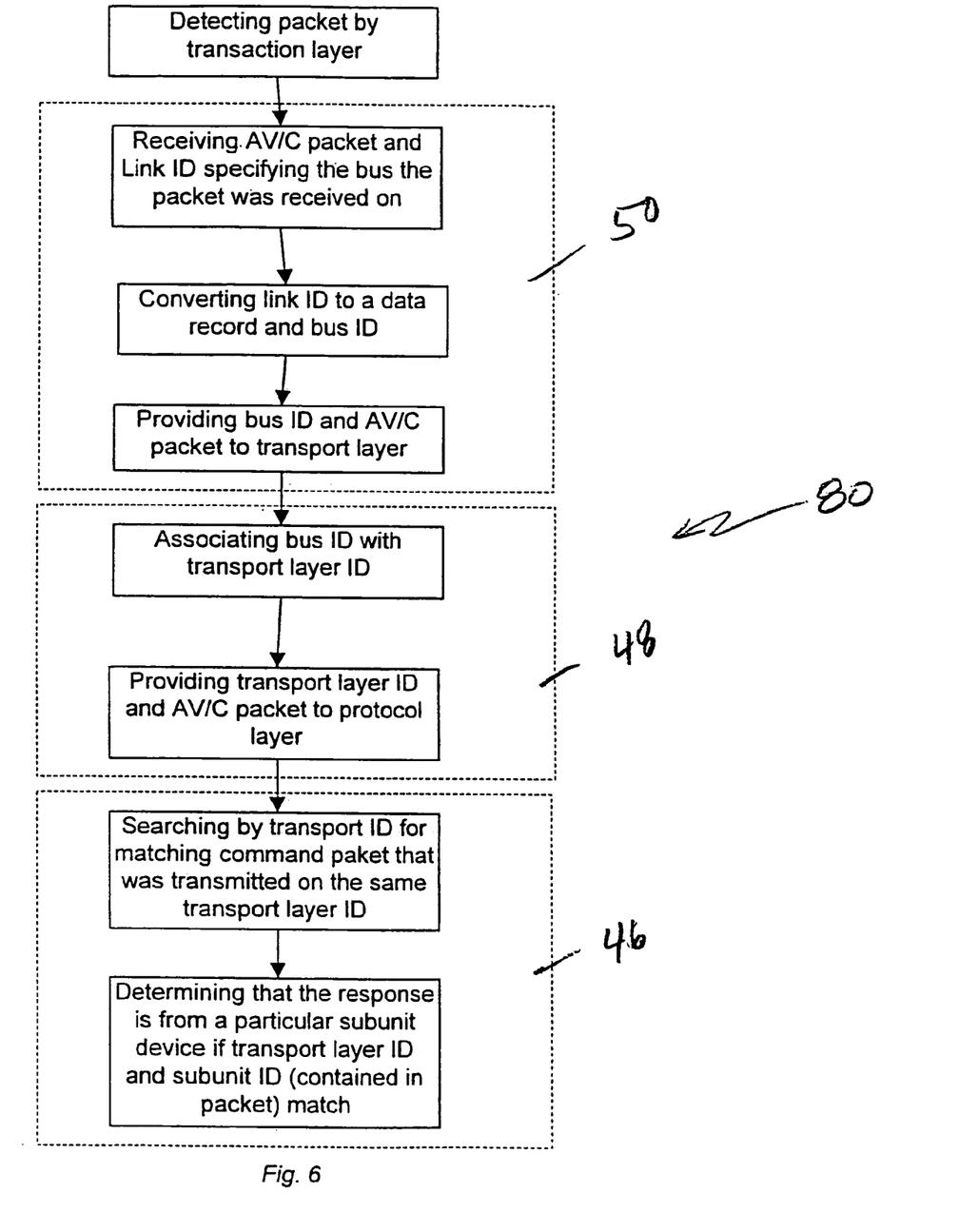
FIG. 6 is a flowchart of the method of receiving AV/C data packets of the present invention.

On the other hand, and referring now also to FIG. 6 and method 80, when a data packet 12 is sent to the protocol layer 46, the transmission occurs in the following manner. The data packet is first detected by the transaction layer of the lower level transaction layer of the associated link that the data packet 12 has been sent. Upon receipt of this data, the transport controller 56 converts the link ID to a data record and bus ID in a memory space. The transport controller 56 then provides the data packet along with the bus ID 54 and data record location to the transport layer 48. The transport layer 48 correlates the bus ID 54 with its transport ID 52. The transport layer then transmits the data packet 12 to the protocol layer along with the transport ID 52.

Thereafter, upon receipt of this data packet 12 and transport ID 52, the protocol layer attempts to correlate this transmission with a previously sent command. Thus, the protocol layer 46 searches by the transport ID 52 for a matching command packet that was transmitted on the same transport layer ID 52. In this manner, the protocol layer 46 may thus determine the subunit device from which the data was sent and pass the information upstream to an appropriate resource for final consumption.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus adapted to communicate a plurality of audio visual data to one or more devices over a plurality of differing transports, comprising:
 a plurality of transport controllers; and
 a protocol stack, wherein said protocol stack, comprises:
  an audio visual protocol layer; and
  an audio visual transport layer in communication with said audiovisual protocol layer;
 wherein said audio visual transport layer is adapted to determine which one of said plurality of transport controllers to call based at least in part on an identification element associated with said plurality of audio visual data and wherein said audio visual transport layer comprises a plug-in software entity that provides transport services to said audio visual protocol layer, said entity being abstracted such that said services provided thereby are the same irrespective of which of said different transports is utilized.

2. The apparatus of claim 1, wherein at least one of said plurality of transport controllers comprises a Function Control Protocol (FCP) transport controller or a Serial Bus Protocol (SBP) transport controller.

3. The apparatus of claim 2, wherein at least one of said plurality of transport controllers comprises an Ethernet IP transport controller.

4. The apparatus of claim 1, wherein said identification element comprises an identification field, and said act of determining is performed by associating said identification element of said plurality of audio visual data with a bus identification field.

5. The apparatus of claim 4, wherein at least one of said plurality of transport controllers is adapted to store a data record comprising said bus identification element.

6. The apparatus of claim 5, wherein said at least one of said plurality of transport controllers is adapted to create a value for said bus identification element.

7. The apparatus of claim 6, wherein said at least one of said plurality of transport controllers is adapted to forward said value in said bus identification field to said audio visual transport layer.

8. The apparatus of claim 7, wherein said audio visual transport layer is adapted to assign a transport instance and associate it with said value in said bus identification element.

9. The apparatus of claim 8, wherein said audio visual transport layer is further adapted to notify said audio visual protocol layer of said transport instance.

10. The apparatus of claim 9, wherein said apparatus is compliant with an IEEE 1394 standard.

11. The apparatus of claim 10, wherein said apparatus is selected from the group consisting of:
   a computer;
   an audio visual camera; and
   an audio visual display device.

12. A method for transmitting data over individual ones of a plurality of heterogeneous transports, comprising:
   receiving a data packet at a first protocol layer;
   consulting a source for a transport identification associated with said data packet;
   providing to a second protocol layer said data packet and said transport identification;
   determining which one of a plurality of transport controllers to call based at least in part on said transport identification at said second protocol layer;
   passing said data packet to said determined one of said plurality of transport controllers; and
   executing a routine at said determined one of said plurality of transport controllers to transport said data packet over one of said plurality of heterogeneous transports, wherein said second protocol layer comprises a plug-in software entity that provides transport services to said first protocol layer, said entity being abstracted such that said services provided thereby are the same irrespective of which of said different transports is utilized.

13. The method of claim 12, wherein said first protocol layer comprises an AV/C protocol layer and said second protocol layer comprises a AV/C transport layer.

14. The apparatus of claim 13, wherein at least one of said plurality of transport controllers comprises an Ethernet IP transport controller.

15. The apparatus of claim 14, wherein at least one of said plurality of transport controllers comprises a Function Control Protocol (FCP) transport controller.

16. The apparatus of claim 15, wherein at least one of said plurality of transport controllers comprises a Serial Bus Protocol (SBP) transport controller.

17. An interface apparatus adapted to communicate a plurality of data packets to one or more devices via individual ones of a plurality of differing transports, comprising:
   a plurality of transport controllers; and
   a protocol stack, wherein said protocol stack, comprises:
      a protocol layer; and
      a transport layer in communication with said protocol layer, said transport layer comprising a software entity that provides transport services to said protocol layer;
   wherein said transport layer is adapted to determine which one of said plurality of transport controllers to call based at least in part on an identification field associated with said plurality of data packets and wherein said transport layer comprises a plug-in software entity that provides transport services to said protocol layer, said entity being abstracted such that said services provided thereby are the same irrespective of which of said different transports is utilized.

18. The apparatus of claim 17, wherein said transport layer is abstracted such that said services provided by said transport layer are substantially identical irrespective of which of said different transports is utilized.

19. The apparatus of claim 18, wherein apparatus interfaces between an Internet Protocol (IP) based environment and a high-speed serialized protocol environment.

20. Apparatus adapted to communicate a plurality of audio visual data to at least one device over a plurality of differing transports, comprising:
   a plurality of transport controller means; and
   a protocol stack, said protocol stack comprising an audio visual protocol layer and an audio visual transport layer in communication with said audiovisual protocol layer;
   wherein said audio visual transport layer is adapted to determine which one of said plurality of transport controller means to call based at least in part on a means for identification associated with said plurality of audio visual data; and
   wherein said audio visual transport layer comprises a software entity that provides transport services to said audio visual protocol layer, said entity being abstracted such that such services provided thereby are the same irrespective of which of said different transports is utilized.

21. The apparatus of claim 20, wherein at least one of said plurality of transport controller means comprises a Function Control Protocol (FCP) transport controller or a Serial Bus Protocol (SBP) transport controller.

22. The apparatus of claim 20, wherein at least one of said plurality of transport controller means comprises an Ethernet IP transport controller.

23. The apparatus of claim 20, wherein said means for identification comprises an identification field, and said act of determining is performed by associating said means for identification of said plurality of audio visual data with a bus identification field.

24. The apparatus of claim 23, wherein at least one of said plurality of transport controller means is adapted to store a data record comprising said bus identification element.

25. The apparatus of claim 20, wherein said apparatus is compliant with an IEEE 1394 standard and is selected from the group consisting of:
   a computer;
   an audio visual camera; and
   an audio visual display device.

* * * * *

UNITED STATES PATENT AND TRADEMARK OFFICE
CERTIFICATE OF CORRECTION

PATENT NO. : 7,421,507 B2  Page 1 of 8
APPLICATION NO. : 11/540303
DATED : September 2, 2008
INVENTOR(S) : Erik P. Staats It is certified that error appears in the above-identified patent and that said Letters Patent is hereby corrected as shown below:

The title page showing an illustrative figure should be deleted to be replaced with the attached title page.

Title page 2 Item [56] "Enhancements to the AV/C General Specifiction 3.0 Version 1. OFCI" 1394 Trade Association pp. 4 6-17 Nov. 5, 1998."

Should Read:
--Enhancements to the AV/C General Specification 3.0
Version 1. OFCI" 1394 Trade Association pp. 4 6-17 Nov. 5, 1998.--

In the Drawings:
The drawing sheets, consisting of figs. 1-6, should be deleted to be replaced with the drawing sheets, consisting of figs. 1-6, as shown on the attached pages.

Signed and Sealed this

Third Day of August, 2010

David J. Kappos
*Director of the United States Patent and Trademark Office*

(12) United States Patent
Staats (10) Patent No.: US 7,421,507 B2
(45) Date of Patent: Sep. 2, 2008

(54) TRANSMISSION OF AV/C TRANSACTIONS OVER MULTIPLE TRANSPORTS METHOD AND APPARATUS

(75) Inventor: Erik P. Staats, Ben Lomond, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 11/540,303

(22) Filed: Sep. 28, 2006

(65) Prior Publication Data
US 2007/0027998 A1 Feb. 1, 2007

Related U.S. Application Data

(63) Continuation of application No. 09/505,385, filed on Feb. 16, 2000, now abandoned.

(51) Int. Cl.
*G06F 15/16* (2006.01)
(52) U.S. Cl. .............. 709/230; 709/203; 709/213; 709/238; 709/240; 709/244; 709/246; 710/29; 710/105; 710/306; 710/316
(58) Field of Classification Search .............. 709/202, 709/228, 232, 203, 213, 231, 238, 246, 230, 709/236, 240, 244; 710/29, 105, 306, 316
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 4,750,109 A | 6/1988 | Kita | |
| 5,014,262 A | 5/1991 | Harshavardhana | |
| 5,274,631 A | 12/1993 | Bhardwaj | |
| 5,341,377 A * | 8/1994 | Ohtani | 370/524 |
| 5,343,461 A | 8/1994 | Barton et al | |
| 5,376,969 A | 12/1994 | Zdepski | |
| 5,394,556 A | 2/1995 | Oprescu | |
| 5,452,330 A | 9/1995 | Goldstein | |
| 5,490,253 A | 2/1996 | Laha et al. | |
| 5,493,568 A | 2/1996 | Sampat et al. | |
| 5,495,481 A | 2/1996 | Duckwall | |
| 5,535,338 A * | 7/1996 | Krause et al. | 709/222 |
| 5,537,417 A * | 7/1996 | Sharma et al. | 709/228 |
| 5,539,390 A | 7/1996 | Nagano et al. | |
| 5,541,670 A | 7/1996 | Hanai | |
| 5,568,487 A | 10/1996 | Sitbon et al. | |
| 5,568,641 A | 10/1996 | Nelson | |

(Continued)

OTHER PUBLICATIONS

"Information Technology-Microprocessor Systems-Control and Status Registers (CSR) Architecture for Microcomputer Buses" ANSI/IEEE Standard 1212 The Institute of Electrical and Electronics Engineers Inc. pp. 1-222 1994 Edition.

(Continued)

*Primary Examiner*—Michael Won
(74) *Attorney, Agent, or Firm*—Gazdzinski & Associates (57) ABSTRACT

Disclosed is a system and method for transmitting AV/C data over one or more transports. Further disclosed is a system and method for transmitting AV/C data over non-FCP communication media. The disclosed system and method includes an AV/C transaction delivery system which operates in conjunction with communicatively coupled AV/C protocol layers, AV/C transport layers, and AV/C transport controllers to effectuate transmission of AV/C transaction data without regard to protocol.

25 Claims, 6 Drawing Sheets